(12) United States Patent
Hara et al.

(10) Patent No.: US 7,286,163 B2
(45) Date of Patent: Oct. 23, 2007

(54) IMAGE TAKING DEVICE WITH BENT OPTICAL SYSTEM

(75) Inventors: Yoshihiro Hara, Kishiwada (JP); Sadanobu Ueda, Osaka (JP); Yoshito Iwasawa, Tokyo (JP); Kazuaki Matsui, Osaka (JP); Akira Kosaka, Yao (JP); Satoshi Yokota, Toyonaka (JP)

(73) Assignee: Minolta Co., Ltd., Osaka (JP)

( * ) Notice: Subject to any disclaimer, the term of this patent is extended or adjusted under 35 U.S.C. 154(b) by 840 days.

(21) Appl. No.: 10/449,099

(22) Filed: Jun. 2, 2003

(65) Prior Publication Data

US 2004/0141065 A1 Jul. 22, 2004

(30) Foreign Application Priority Data

Jan. 17, 2003 (JP) ............................. 2003-009889

(51) Int. Cl.
*H04N 5/228* (2006.01)
(52) U.S. Cl. ................................. 348/208.11
(58) Field of Classification Search ................................ 348/208.1–208.16, 218.1, 219
See application file for complete search history.

(56) References Cited

U.S. PATENT DOCUMENTS

| | | | | |
|---|---|---|---|---|
| 5,867,213 A | * | 2/1999 | Ouchi | 348/208.5 |
| 5,889,553 A | * | 3/1999 | Kino et al. | 348/218.1 |
| 6,108,036 A | * | 8/2000 | Harada et al. | 348/219.1 |
| 6,421,506 B1 | * | 7/2002 | Maruyama | 396/303 |
| 6,464,363 B1 | * | 10/2002 | Nishioka et al. | 359/846 |
| 2004/0012683 A1 | * | 1/2004 | Yamasaki et al. | 348/208.1 |

FOREIGN PATENT DOCUMENTS

| | | |
|---|---|---|
| JP | 3-93368 | 4/1991 |
| JP | 4-163533 | 6/1992 |
| JP | 04-180040 | 6/1992 |
| JP | 4-211230 | 8/1992 |
| JP | 05-11304 | 1/1993 |
| JP | 6-153057 | 5/1994 |
| JP | 2000-171845 A | 6/2000 |

* cited by examiner

*Primary Examiner*—David Ometz
*Assistant Examiner*—Tuan Le
(74) *Attorney, Agent, or Firm*—McDermott Will & Emery LLP

(57) ABSTRACT

A digital camera having an image shake correction apparatus and a method of preventing the image shake of an image taken by the digital camera. The digital camera includes optical elements arranged along a bent line for focusing an object image upon a light receiving plane in which the elements include at least one mirror which reflects a light from an object toward the light receiving plane, a driver for moving the mirror so as to turn its light axis having been bent by the mirror, a vibration sensor for sensing a vibration of a camera body, and a processor for making the driver move the mirror based on the sensed vibration. The mirror turns so as to cancel the vibration of the object image focussed on the light receiving plane.

1 Claim, 11 Drawing Sheets

Fig.3

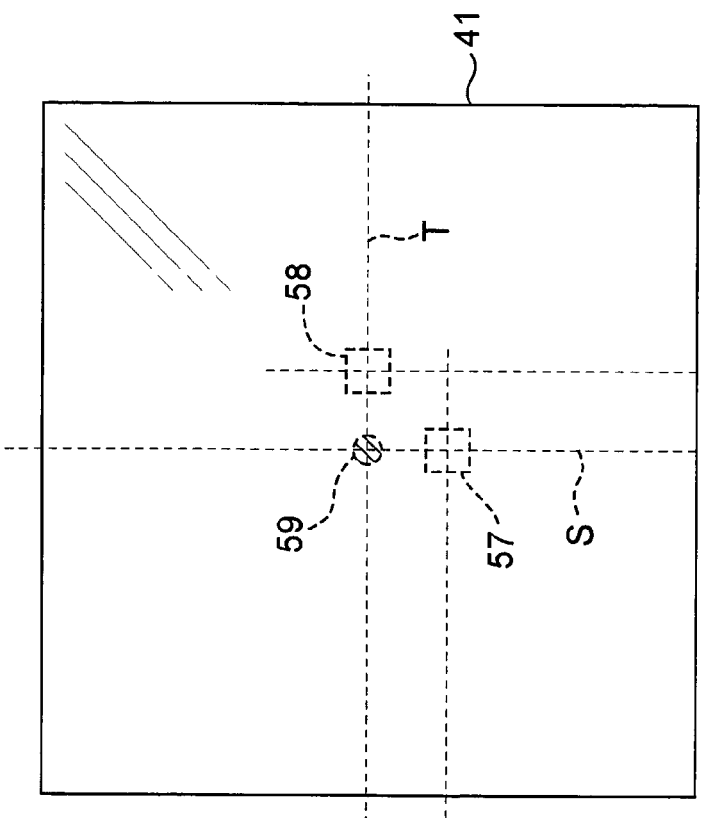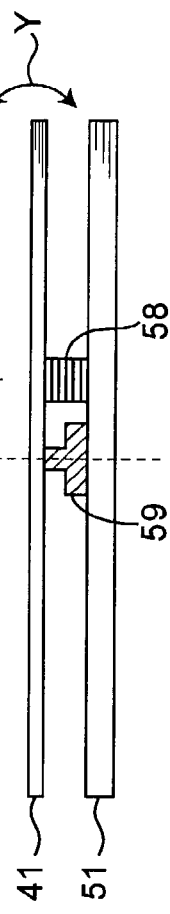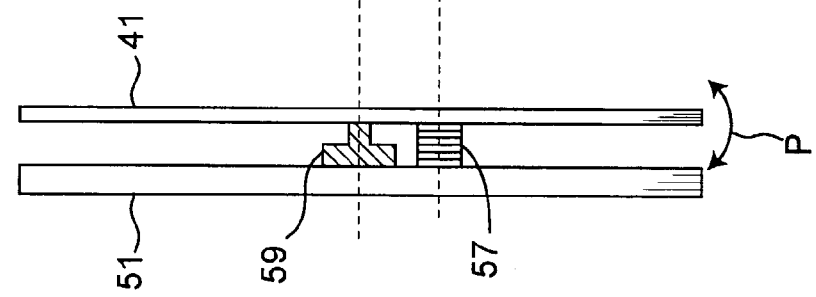

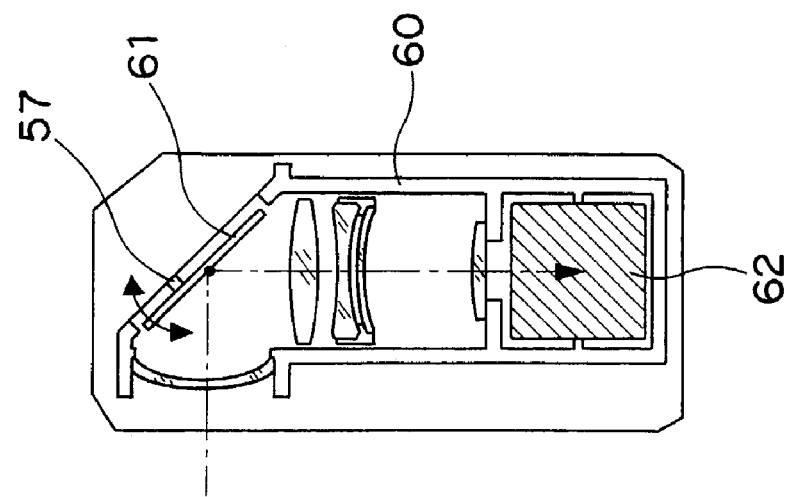
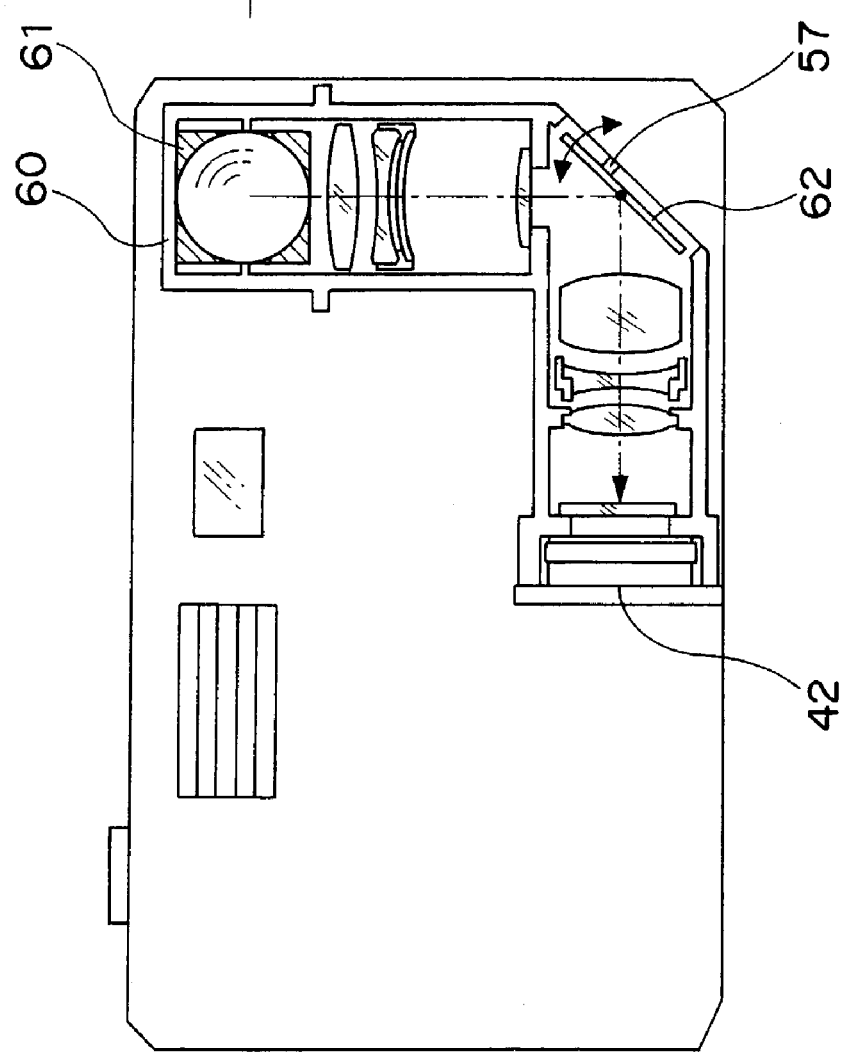

IMAGE TAKING DEVICE WITH BENT OPTICAL SYSTEM

This application is based upon application No. 2003-9889 filed in Japan, the contents of which are hereby incorporated by reference.

BACKGROUND OF THE INVENTION

1. Field of the Invention

The present invention relates to an image taking device, such as a digital camera, provided with a bent optical system.

2. Description of the Related Art

When a body of a camera, as an image taking device, is moved by vibration or shaking of hands which hold the body while taking an image of an object (or while exposing), the image thereof formed or focused on an acceptance surface, or on a light receiving surface, moves or shifts with respect to the acceptance surface, so that a captured image, becomes uncleared or blurred. In order to solve this problem, there has been proposed a camera provided with an image shake preventing mechanism, which makes an optical axis thereof deflect so as to counteract a shift of the image focus position with respect to the acceptance surface, when the camera is moved or shaken with respect to the object.

As for such an image shake preventing mechanism, there has been proposed one type thereof which translates an image shake preventing lens in parallel with a direction perpendicular to the optical axis as disclosed in, for example, Japanese Non-Examined Laid-Open Patent Publication No. 4-180040. Also, there has been proposed the other type thereof which tilts an incident plane or a reflection plane of a Vari-Angle Prism, as disclosed in, for example, Japanese Non-examined Laid-Open Patent Publication No. 5-11304.

On the other hand, there has been provided a camera, an optical axis of which is bent so as to make the camera low-profile and compact. Such a camera has a high sensitivity to an error due to its small construction, or miniaturization, thereof, so that only a small error causes a great influence on the performance thereof. Thus, it is necessary to adjust a deflection or eccentricity of the optical axis accurately. Such an adjustment is, however, difficult. Moreover, the shake of such a low-profile camera tends to be relatively greater.

In order to provide the camera with such an image shake preventing function, the aforementioned one type thereof in which the image shake preventing lens is translated in a direction perpendicular to the optical axis, requires a 2-dimensional slide mechanism arranged around an image taking optical system. Therefore, the construction thereof becomes complicated. As for the aforementioned other type thereof, the optical aberration of the Vari-Angle Prism is large, and it is not suitable for a still picture record type of camera which is expected to have a high performance.

SUMMARY OF THE INVENTION

Accordingly, it is an object of the present invention to provide an image taking device, such as a digital camera, provided with a bending optical system (or a bent optical system), to which an image shake preventing function is added without sacrificing the miniaturization or downsizing thereof.

It is another object of the present invention to provide the image taking device having the bending optical system, in which it is easy to adjust a deflection of its optical axis.

It is still another object of the present invention to provide a method for preventing an image shake of the image taking device having the bending optical system.

In order to achieve these and other objects of the present invention, according to one aspect thereof, there is provided an image taking device for taking an image of an object, comprising: a bending optical system (or a bent optical system) for forming or focusing the image thereof on an acceptance surface (or a light receiving surface), in which the bending optical system includes at least one optical bending member which bends an optical axis of the bending optical system from the object to the acceptance surface; a driving mechanism for driving the at least one optical bending member so as to change angle of the optical axis having been bent by the at least one optical bending member; a shake detector for detecting a shake of a body of the image taking device; and a controller for controlling the driving mechanism on a basis of the shake of the body of the image taking device detected by the shake detector, so that the at least one optical bending member is driven by the driving mechanism so as to cancel or counteract the shake or movement of the image of the object formed on the acceptance surface.

In the construction, there is arranged an image sensor or a silver halide film for example, on the acceptance surface, at the position where the bending optical system focuses the image of the object.

According to the construction, the shake detector detects the shake or movement of the body of the image taking device. The shake detected by the shake detector includes not only the change of angle of the body, but also the movement thereof. Based upon the shake thus detected, the driving mechanism drives the at least one optical bending member so that the at least one optical bending member changes the angle of the optical axis of the bending optical system in order to restrict any deviation of the position of the image focused on the acceptance surface within an allowable range. Thereby, a clear image of the object having no image shake can be taken or captured, even if the body of the image taking device is moved due to a shake of the user's hands holding the body. The driving mechanism is not necessary to be arranged all around the bending optical system, but the driving mechanism can be arranged on one side only relative to the bending optical system.

With the construction, there is provided the image taking device having the bent optical system, to which the image shake preventing function is added without sacrificing the miniaturization or downsizing thereof.

Preferably, the at least one optical bending member is supported pivotally about one point, and the driving mechanism drives the at least one optical bending member so as to change the angle of the at least one optical bending member.

The "one point" can be substantially or generally one point; therefore, the "one point" includes such a point as having an area.

The above construction is simple and is easy to be downsized, comparing with a construction in which the optical bending member translates parallel. Especially, the above construction is suitable for a digital camera, as the image taking device, which requires to be made low-profile and compact.

Preferably, the driving mechanism includes an actuator using a piezoelectric element.

The actuator using the piezoelectric element is suitable for the driving mechanism, because it has a high response performance and is easy to be miniaturized.

Preferably, the at least one optical bending member driven by the driving mechanism is a mirror.

According to the construction, a reflection surface of the mirror bends the optical axis of the bending optical system. The mirror is lighter than a prism, and a space where the mirror is arranged is smaller than that where the prism is arranged. In a case of the prism, movement of a reflection surface thereof causes an input surface thereof and an output surface thereof also to move. The mirror, however, does not cause such a complicated movement.

Alternatively, the at least one optical bending member driven by the driving mechanism can be a prism.

Preferably, at least one of the optical bending members, which are driven by the driving mechanism, has a reflection surface, which bends the optical axis of the bending optical system. Behind the reflection surface, or in a space opposite to a side of the optical axis with respect to the reflection surface, there are arranged main parts, or components, of a mechanism for realizing the prevention (or compensation or correction) of the image shake. The main parts thereof include parts constituting at least the driving mechanism, and more preferably, the main parts further include the shake detector.

Namely, preferably, the driving mechanism is arranged behind the at least one optical bending member, and/or the shake detector is arranged behind the at least one optical bending member.

According to such a construction, the space behind the reflection surface can be used effectively so as to reduce the size of the body.

Preferably, the driving mechanism drives the at least one optical bending member so as to adjust a deflection of the optical axis of the bending optical system.

According to the construction, it is possible to adjust the deflection of the optical axis of the bending optical system, or to change the amount of adjustment based on the change in properties with time, the change in temperature, the change in focal length, and so on.

That is, with the construction, it is easy to adjust the deflection of the optical axis.

Preferably, the at least one optical bending member driven by the driving mechanism and the driving mechanism are mounted on a moving unit, and the moving unit is movably mounted by a position adjuster.

In the construction, the position adjuster adjusts the location, or position, of the moving unit so as to adjust the deflection of the optical axis of the bending optical system. With the construction, it is possible to adjust the deflection of the optical axis thereof precisely, or possible to change the amount of adjustment based on the change of properties with time, the change of temperature, the change of focal length, and so on, by the driving mechanism.

Accordingly, it is easy to adjust the deflection of the optical axis.

The construction, in which the at least one optical bending member of the bending optical system is driven so as to prevent (or compensate or correct) the shake of image of an object, can be applied not only to a digital camera, but also binocular glasses, and so on.

In order to achieve the above objects, according to another aspect of the present invention, there is provided a method for preventing an image of an object taken by an image taking device from shaking, in which the image taking device comprises a bending optical system for forming or focusing the image thereof on an acceptance surface (or a light receiving surface), and in which the bending optical system includes at least one optical bending member which bends an optical axis of the bending optical system from the object to the acceptance surface, the method comprising: a shake detecting step of detecting a shake of a body of the image taking device; and a controlling step of controlling to drive the at least one optical bending member on the basis of the shake of the body detected at the shake detecting step so that the shake of the image of the object focused or formed on the acceptance surface is cancelled or counteracted.

In the method, preferably, the controlling step of controlling to drive the at least one optical bending member includes a driving step of driving the at least one optical bending member so as to change angle of the at least one optical bending member.

In the method, preferably, it further comprises an adjusting step of driving the at least one optical bending member so as to adjust a deflection of the optical axis of the bending optical system.

BRIEF DESCRIPTION OF THE DRAWINGS

These and other objects and features of the present invention will become clear from the following description taken in conjunction with a preferred embodiment thereof with reference to the accompanying drawings.

FIG. 3 is a schematic block diagram thereof.

FIGS. 10A, 10B and 10C are enlarged views showing a drive mechanism for driving the mirror.

FIGS. 12A and 12B are perspective projection views of the digital camera having the bent optical system as shown in FIG. 11.

DETAILED DESCRIPTION OF THE PREFERRED EMBODIMENT

Figure 1:
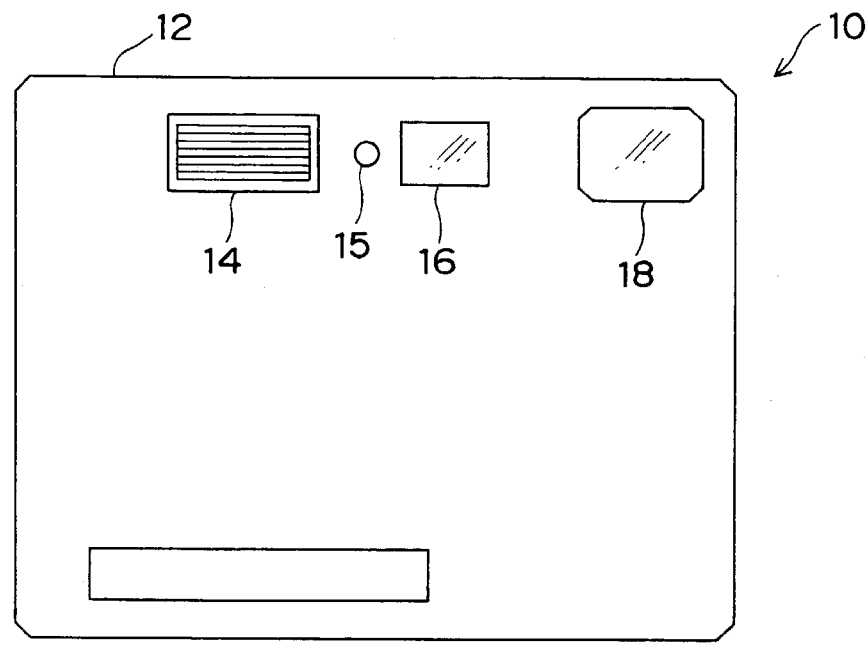
FIG. 1 is a front elevation view of a digital camera, as an image taking devise, according to a preferred embodiment of the present invention.

Before the description of a preferred embodiment of the present invention proceeds, it is to be noted that like or corresponding parts are designated by like reference numerals or characters throughout the accompanying drawings.

A detailed description is made below upon a digital camera 10, as an image taking device, of the embodiment, with reference to FIG. 1 through FIG. 12B.

Figure 2:
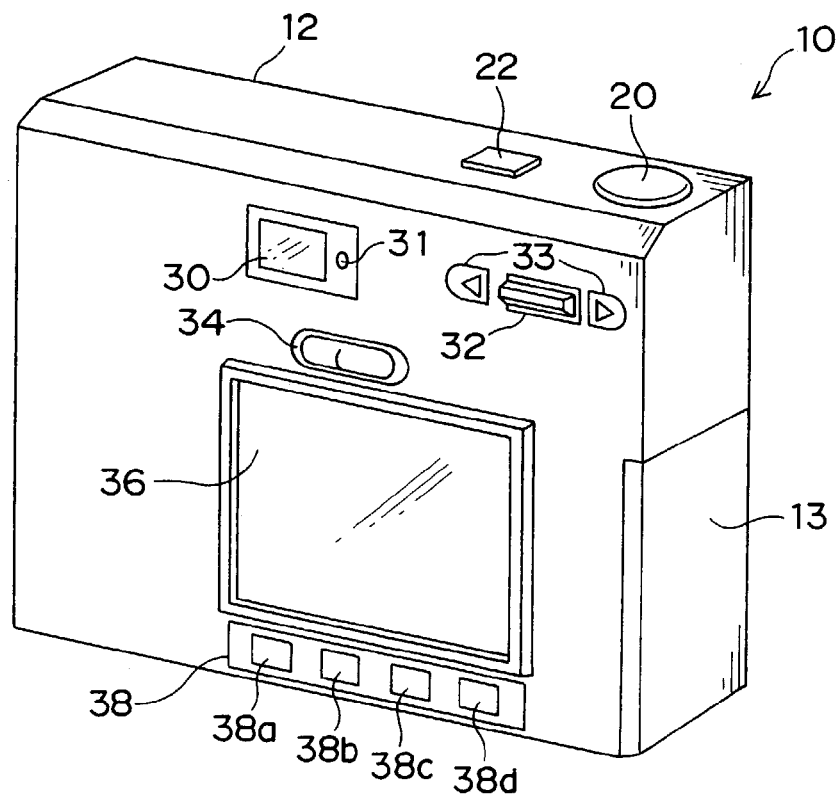
FIG. 2 is a rear perspective view thereof.

Each of FIGS. 1 and 2 shows an appearance of the digital camera 10.

As shown in FIG. 1, on a front surface of a camera body 12, there are arranged: a flash device 14 for emitting flash light in order to illuminate a photographic subject or object when it is dark; a photometry sensor 15 for detecting an object's brightness in order to determine an optimal condition of exposure; a finder object aperture 16 of an optical finder; and a lens opening 18 for leading a light from the subject to an image sensor (for example, CCD) through an image taking optical system.

FIG. 2 is a rear perspective view showing a backside of the digital camera 10.

A shutter start button (hereinafter, also referred to as "shutter button") 20 and a main switch 22 are arranged on the upper surface of the camera body 12. The shutter button 20 is an operation button for capturing an image with the digital camera 10. The main switch 22 is a power switch of the digital camera 10.

Three of the image capturing state can be set by the operation of the shutter button 20. That is, when there is no operation of the shutter button 20, an "OFF state" or a standby state is set. By half-pressing of the shutter button 20, a "preparation state", in which a S1 switch is turned "ON", is set. By full-pressing of the shutter button 20, a "start state", in which a S2 switch is turned "ON", is set.

On a rear surface of the camera body 12, there are arranged: a finder eyepiece window 30 for checking an object's condition through the optical finder; a focus lamp 31 which is arranged on the right side of the finder eyepiece window 30 and which displays a focusing state and so on; a zoom lever 32; a right-and-left key 33; a selector switch 34 for switching the modes (for example, recorded image reproducing display mode, image capturing mode, moving image capturing mode, etc.) of the camera 10; a display 36 (including, for example, a color liquid crystal panel) which displays a live view image, an image being recorded and so on; and a mode button set 38 of mode buttons 38a-38d. The mode button 38d is an image shake preventing ON/OFF button.

The zoom lever 32 and the right-and-left key 33 are used in the image capturing mode or in a reproducing mode. In the image capturing mode, the focal length of a taking lens can be changed by moving the zoom lever 32 up and down, and an exposure of captured image can be adjusted by pressing the right-and-left key 33. In the reproducing mode, the zoom lever 32 and the right-and-left key 33 operate as a switch for selecting items shown in the display device 36. Specifically, operation of the zoom lever 32 and the right-and-left key 33 with reference to a display of the display device 36 can change a flash luminescence state, an image-processing mode of the camera, an image size to be recorded, and a compression level of the recorded image and so on.

A lid 13 is arranged on a side of the camera body 12. By opening the lid 13, a battery and a memory card, which are not illustrated, can be set or removed therethrough. It is realized to reduce the thickness of the digital camera 10, by making the single lid 13 function as a lid for the battery and for the memory card.

Figure 3:
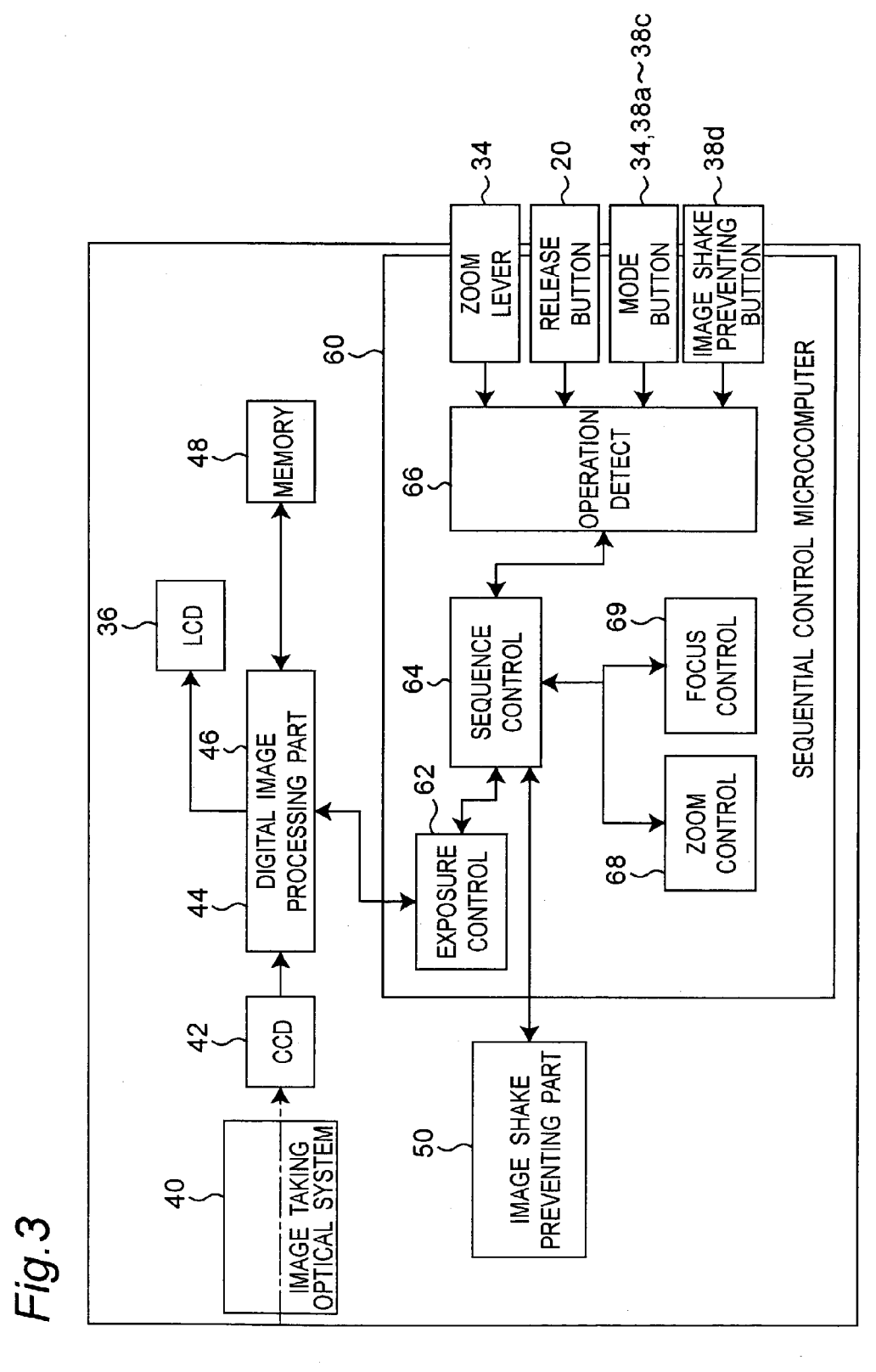

Next, it is explained about a system of the digital camera 10, referring to FIG. 3.

The image taking optical system 40 having a taking lens, leads or guides an object image to the image sensor 42 (for example, CCD). The image sensor 42 carries out photoelectric transducing operation, and it outputs a data of the object. The data from the image sensor 42 is send to a digital image processing part 44. The digital image processing part 44 processes black level correction, color pixel interpolation processing, exposure correction, gamma control, contrast correction, sharpness correction, resolution conversion, image compression, and the like, which are required for digital image processing. The digital image processing part 44 outputs the processed data to the display device 36 and a memory 48. The display device 36 displays a live view image, an image recorded on the memory 48, and a camera state. A memory 48, for example, a removable flash memory card, records photography picture data.

A sequence control microcomputer 60 carries out a sequence system processing operation of the digital camera 10. The sequence control microcomputer 60 includes an exposure control part 62, a sequence control part 64, an operation detection part 66, a zoom control part 68, and a focus control part 69. The operation detection part 66 detects the states of various operation switches 34, 20, 34, 38a-38c and 38d, and it transmits them to the sequence control part 64. The sequence control part 64 controls the sequence (or state of operation) of the digital camera 10 based on the state of various operation switches 34, 20, 34, 38a-38c, 38d, and so on. The exposure control part 62 determines the exposure state of the camera 10 based on an output of the photometry sensor 15, and it controls the exposure time of the image sensor 42 and opening-and-closing state of a shutter. The zoom control part 68 changes the focal length of the taking lens (or photographing lens), responding to the operation of the zoom lever 34. The focus control part 69 detects the state of contrast of the image captured with the image sensor 42, determines the optimal focal position, and drives a focus lens of the taking lens.

An image shake preventing part 50 carries out image shake preventing operation, responding to a command from the sequence control part 64.

On the basis of the control of the sequence control microcomputer 60, the camera 10 operates generally as follows. After half-pressing of the shutter button 20, a live view is displayed on the display device 36, until changing to a sleep state by auto-power-off (normally, for example, about 30 seconds). By the half-pressing of the shutter button 20, the photometry sensor 15 starts to be operated and an exposure control value is determined. Additionally, a focusing position to be adjusted is detected. At this time, the image shake preventing operation is carried out, if the image shake preventing ON/OFF button 38d is in the "ON" state. When it is detected that the shutter button 20 is pressed fully or completely, an image of the object is taken by the image sensor 42, and it is recorded on the memory 48. At this time, the image shake preventing operation is carried out, if the image shake preventing ON/OFF button 38d is in the "ON" state.

Next, it is explained about the image shake prevention of the digital camera, referring to FIGS. 4, 5, and 8-10.

The occurrence of the image shake of an object upon taking an image thereof with the camera is caused by a vibration derived from a combination of: vibration having about 10 Hz with a small amplitude, caused by vibration of man's muscles; vibration having 3 Hz or less with a large amplitude, caused by the shake of man's body; and vibration having about 5 Hz, caused by pressing the shutter button 20 (or an image capturing switch) upon shooting. The construction, or mechanism, for preventing such an image shake of an object is shown in FIGS. 4, 5A, 5B, 9A, 9B, 10A and 10B.

Figure 4:
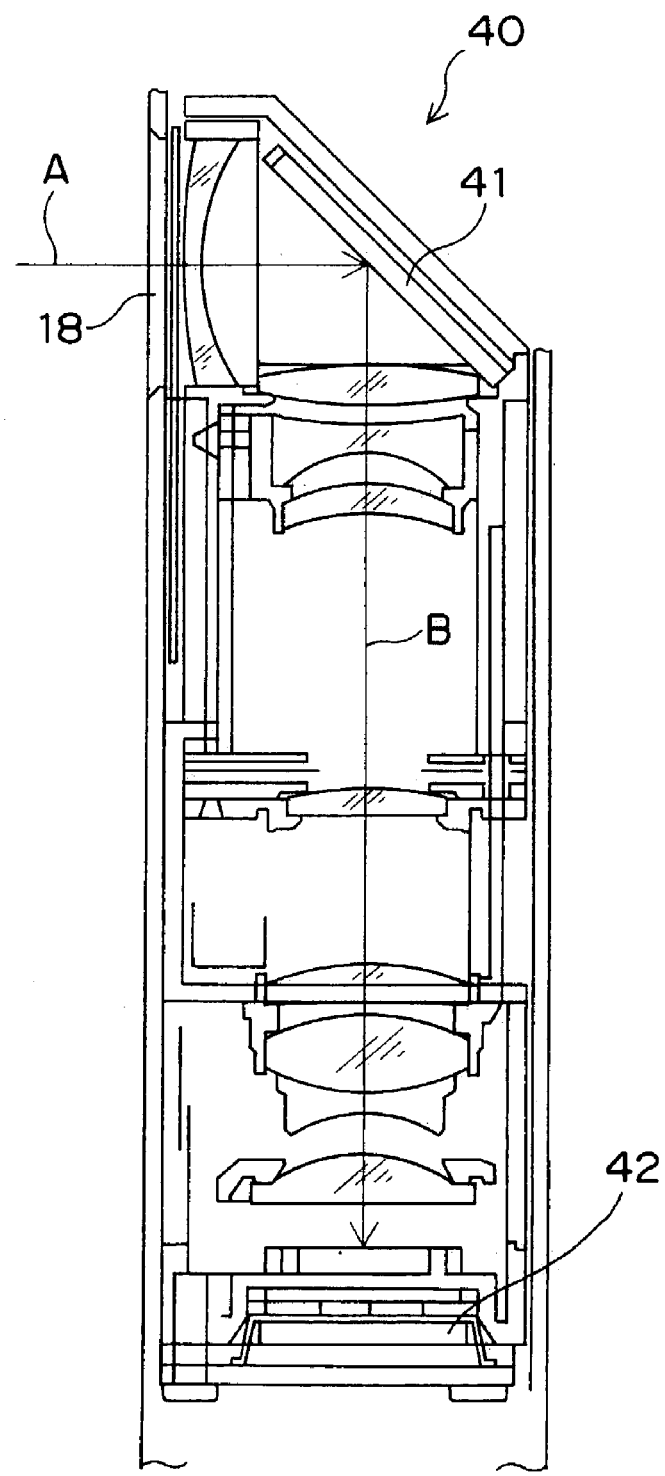
FIG. 4 is a sectional view showing a constitution of a bent optical unit thereof.
Figure 5:
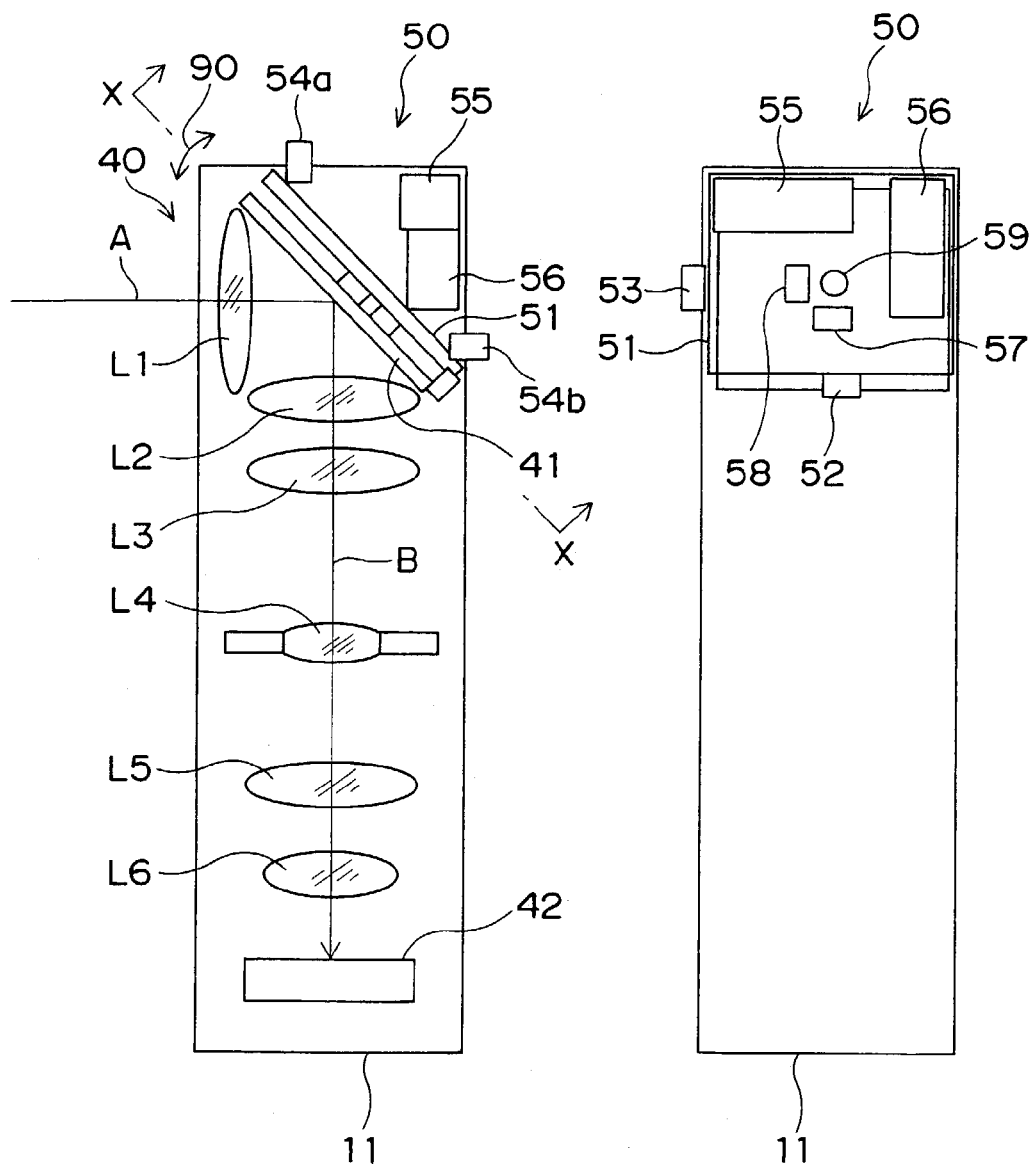
FIGS. 5A and 5B are schematic illustrations of an image shake preventing mechanism thereof.

FIG. 4 shows the bent optical unit which includes the image taking optical system 40 built in the camera body 12 of the digital camera 10. The image taking optical system 40 is the one which bends its optical axis into forming optical axes A and B. More specifically, the light coming into the system through the lens opening 18 of the camera body 12 is reflected toward the image sensor 42, which is shown at a lower part of FIG. 4, at a generally right angle by a mirror 41.

As a modification, instead of the mirror 41, another component such as a prism can be used to bend or reflect the light.

Upon capturing the image of an object, if the camera body 12 is shaked or vibrated by a shake or vibration of the user holding the camera body 12, the light path for leading the light from the object to the acceptance surface of the image sensor 42 changes, and thereby the object image moves and overlaps with respect to the acceptance surface thereof, so that an indistinct blurred image is captured. In order to prevent such an image shake, the image of the object must be focused at the same position with respect to the acceptance surface of the image sensor 42 during the image taking. That is, the light path must be rectified, or corrected (or compensated), so as to counteract the shake of the camera 10, by means of detecting the shake thereof.

Each of FIGS. 5A and 5B shows a mechanism for preventing such an image shake.

In a camera cone unit 11, the image taking optical system 40, the image sensor 42, and the image shake preventing part 50 are arranged. The image taking optical system 40 includes a plurality of lenses L1-L6 and the mirror 41, so that an image of the object is focused onto the acceptance surface of the image sensor 42. The mirror 41 bends the optical axis A into the optical axis B in the image taking optical system 40 generally at a right angle, or perpendicularly.

A back of the mirror 41 is supported by a mirror base 51. The image shake preventing part 50 drives the mirror 41 so as to change the angle of the mirror 41 with respect to the mirror base 51. The image shake preventing part 50 is arranged in an empty space behind the mirror 41 in order to make full use of the empty space. Thereby, the camera body can be downsized or miniaturized.

Specifically, as shown in FIGS. 10A, 10B and 10C, the mirror 41 is supported pivotally by one single point, substantially or generally, of a raised portion 59 mounted on the mirror base 51. A pair of actuators 57 and 58, which drive the mirror 41, are mounted on the mirror base 51. In the figures, a straight line "S" connects the actuator 57 and the raised portion 59, and a straight line "T" connects the actuator 58 and the raised portion 59. The straight lines "S" and "T" intersect at the general one point of the raised portion 59. The mirror 41 is rotated by one actuator 57 around the straight line "T" which connects the raised portion 59 and the other actuator 58. Meanwhile, the mirror 41 is rotated around the straight line "S" which connects the raised portion 59 and the one actuator 57.

The raised portion 59 may be made, for example, of rubber having proper hardness, and fixed on both of the mirror base 51 and the mirror 41 with an adhesive. Each of the actuators 57 and 58 is, for example, of a laminating type of piezoelectric elements. As for each of the actuators 57 and 58, both ends thereof in a direction in which each of the actuators 57 and 58 expands and contracts are fixed to the mirror 41 and the mirror base 51, respectively. Applying a voltage to each of the actuators 57 and 58, changes the distance between the mirror 41 and the mirror base 51, so that the angle of the mirror 41 changes relative to the mirror base 51 (therefore, relative to the acceptance surface of the image sensor 42).

As shown in FIGS. 5A and 5B, a pair of shake sensing gyroscopes 55 and 56 are mounted in a space behind the mirror base 51, or in the side opposite to the optical axes A and B. The shake sensing gyroscopes 55 and 56 detect the shake of the camera body 12. One shake sensing gyroscope 55 detects any shake in a pitch direction, or in a direction of vertical rotation around a line perpendicular to a drawing plane of FIG. 5A. The actuator 57 is driven on the basis of the output of the shake sensing gyroscope 55, so that the mirror 41 is rotated in the pitch direction designated by an arrow 90. On the other hand, the other shake sensing gyroscope 56 detects any shake in a yaw direction, or in a direction of horizontal rotation (or lateral rotation) around a vertical line parallel to the drawing plane of FIG. 5A. The actuator 58 is driven on the basis of the output of the shake sensing gyroscope 56, so that the mirror 41 is rotated in the yaw direction.

The mirror 41 is driven with reference to the mirror base 51. The mirror base 51 is fixed to the housing of the camera cone unit 11 through adjustment members 54a and 54b. Fixing position of the mirror base 51 can be adjusted by the adjustment members 54a and 54b, so that a deflection (or alignment) of the optical axis of the bent optical system 40 can be adjusted.

The angle of the mirror 41 is detected by a pair of position sensors 52 and 53. When the mirror 41 is driven by the piezoelectric actuators 57 and 58 directly as mentioned above, each of the driving amounts of the actuators 57 and 58 is generally proportional to a voltage applied thereto, respectively. Therefore, it is preferable that a position of the mirror 41 is detected by the position sensors 52 and 53, or by the image sensor 42, and that the voltage applied to each of the piezoelectric elements is compensated or corrected by feedback of the position of the mirror 41. If compensation of temperature environment etc. is possible, one or both of the position sensors 52 and 53 can be eliminated or omitted.

Figure 9A:
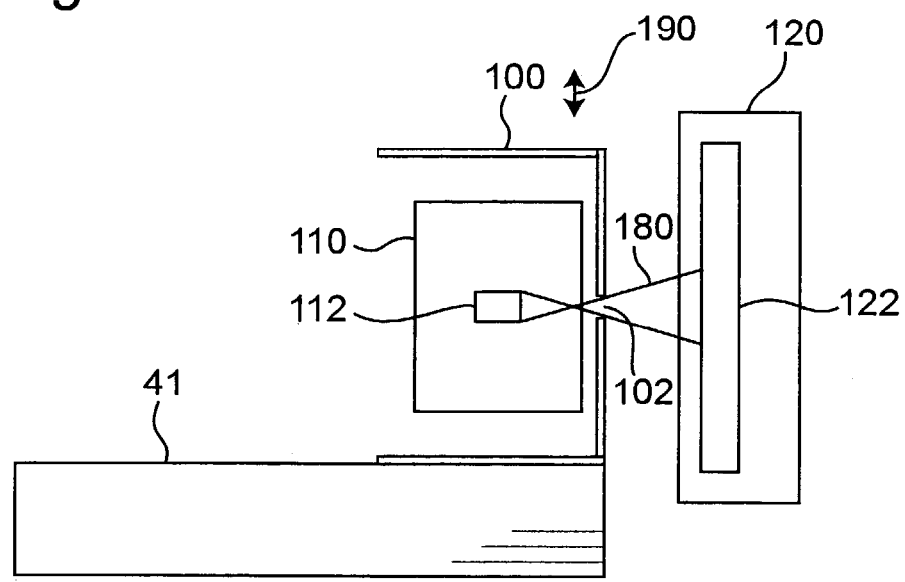
FIG. 9A is a schematic illustration of a position detecting mechanism of a mirror.
Figure 9B:
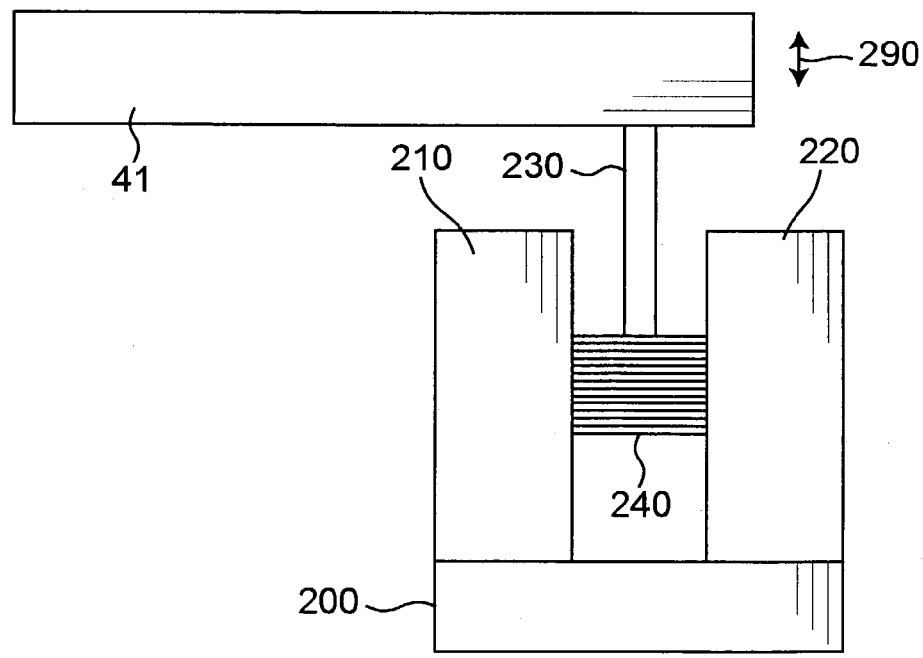
FIG. 9B is a schematic illustration of a position detecting mechanism according to a modification to FIG. 9A.

Specifically, the position sensors 52 and 53 are constructed as shown in FIGS. 9A and 9B.

FIG. 9A schematically shows a construction, in which a PSD (Position Sensitive Detector) type of position sensor is employed for each of the position sensors 52 and 53. A mask member 100 and a small chip IRED (infrared ray emitting diode) 110 are fixed to the mirror 41. The mask member 100 has an opening hole 102, through which a beam of light emitted by the luminescence chip 112 of the small chip IRED 110 is narrowed down. A one-dimensional PSD (Position Sensitive Detector) 120 for detecting a one-dimensional position is arranged opposite the opening hole 102 of the mask member 100, and it is fixed to a housing of the camera cone unit 11, so that the beam of light 180 passing through the opening hole 102 is received by an acceptance unit (or light receiving unit) 122 of the PSD 120. The acceptance unit 122 has a plurality of acceptance elements (or light receiving elements) which detect light and which are arranged in a line. The PSD 120 outputs the optical current from both ends thereof. The ratio of the optical currents changes depending on the position of weighted center of light received by the acceptance elements of the acceptance unit 122 of the PSD 120. Accordingly, based on such a ratio of the outputs of the optical currents, the displacement of the mirror 41, the direction of which is the same as that of the line of the acceptance elements in the acceptance unit 122, can be detected.

FIG. 9B schematically shows a construction according to a modification to FIG. 9A, in which a PI (photo-interrupter) type of position sensor is employed for each of the position sensors 52 and 53. A light blocking member 230 is fixed to the mirror 41. A PI (photo-interrupter) 200 is fixed near to an end of the light blocking member 230. The PI 200 has a light emitting part 210 and a light receiving part 220, between which the end of the light blocking member 230 is inserted. The light emitting part 210 emits a generally parallel beam of light 240 toward the light receiving part 220 as a light acceptance unit. The end of the light blocking member 230 blocks part of the beam of light 240. When the mirror 41 moves in a direction designated by an arrow 290, the amount of light blocked by the end of the light blocking member 230 changes, so that an output of the PI 200 changes depending on the amount of light received by the light acceptance unit 220. Thus, the position of the mirror 41 can be detected, by comparing the output of the PI 200 when the end of the light blocking member 230 blocks none of the beam of light emitted by the light emitting part 210 with the output threof when the end of the light blocking member 230 blocks the beam of light thereof. Using signals of the PI 200 in analog allows the position sensor to be micro-miniaturized.

Figure 6:
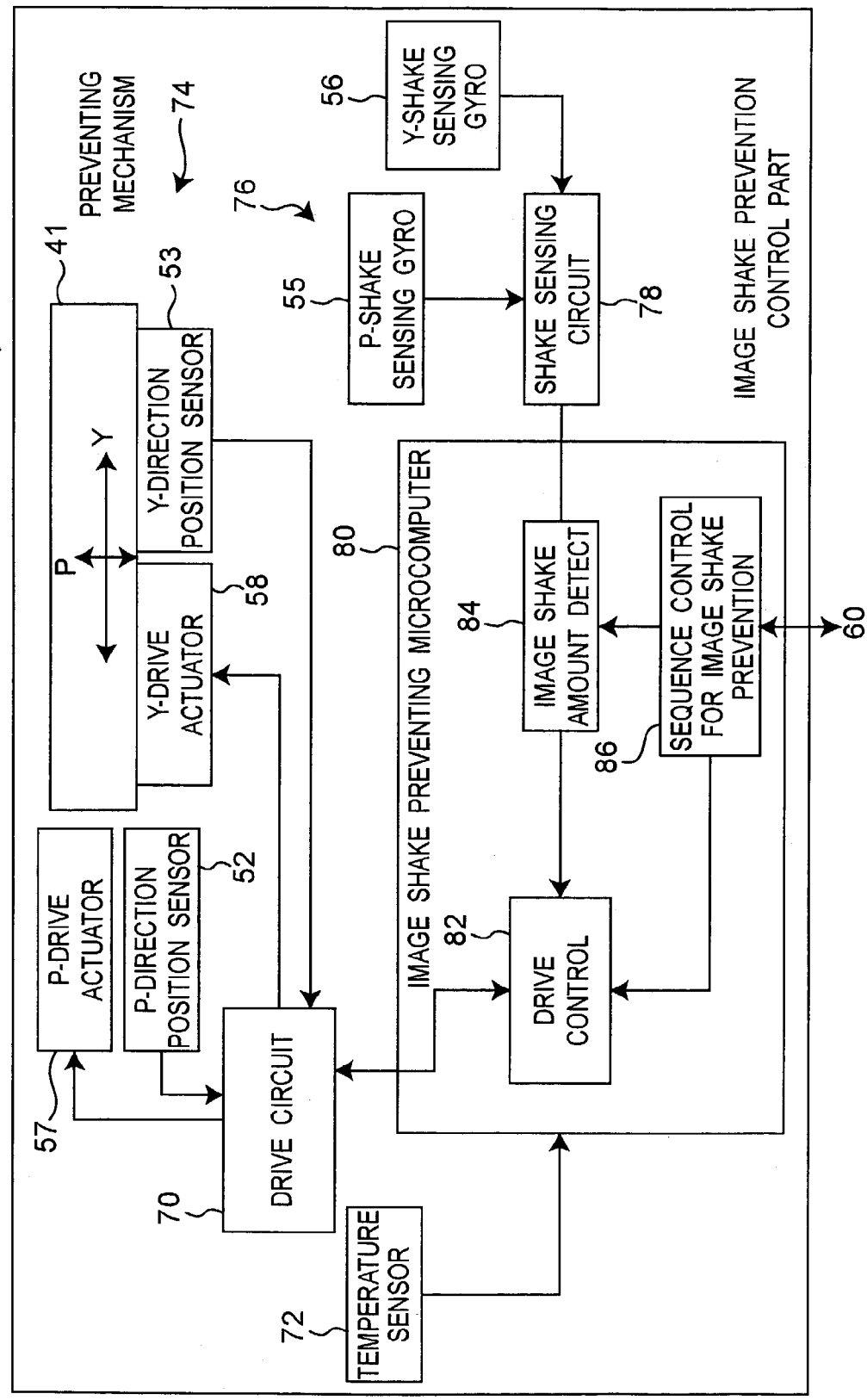
FIG. 6 is a schematic block diagram of the image shake preventing mechanism thereof.

FIG. 6 is a system configuration figure of the image shake preventing part 50 for realizing the compensation, or correction, of the image shake.

A drive circuit 70 which drives the image shake preventing mechanism 74, a shake sensing circuit 78 of an image shake detection system 76, and a temperature sensor 72, are connected to an image shake preventing microcomputer 80 which carries out the image shake preventing control, and which communicates with the sequence control microcomputer 60.

Hereinafter, it is explained about a gyroscope (angular-velocity sensor) detection system, an image shake preventing (or compensation or correction) optical system with a reflection mirror rotating system, and a (digital) servo-control system with direct drive system in which a voltage is applied to a laminating type of piezoelectric elements to be driven and with position sensors.

If a camera is shaken during image taking, an image focused on an imaging surface (or on a surface of an image taking element) moves so that the captured image becomes blurred. It is possible to prevent such an image shake by the detecting system detecting amount and direction of the shake, and by the correcting optical system bending a light from an object in a direction in which the movement of the image with respect to the imaging surface is counteracted. The camera shakes at about 10 Hz of sine waves at maximum. In order to prevent (or compensate or correct) such as image shake, the correction optical system is driven so as to counteract such waves.

The shake sensing gyroscopes 55 and 56 of the image shake detection system 76 are gyroscope sensors for detecting the shake of the camera body 12. The gyroscopes 55 and 56 detect the angular-velocity of rotation caused by the shake of the camera body 12. Each thereof detects rotation in one direction, respectively. Thus, one gyroscope 55 detects a shaking of the rotation in the direction of P (pitch). The other gyroscope 56 detects a shaking of the rotation in the direction of Y (yaw).

The shake sensing circuit 78 of the image shake detection system 76 is provided with: a filter circuit (a low pass filter and a high pass filter) for cutting noise and drift of the signal from the gyroscopes 55 and 56; and an integration circuit for changing a signal of the angular velocity into a signal of an angle, and so on.

A block of the image shake preventing microcomputer 80, which is an image shake preventing control part, is a digital processing part by the microcomputer. The image shake amount detecting part 84 detects the rotations of the P and Y directions outputted from the shake sensing circuit 78 for a predetermined time, and it outputs an amount of rotation of a camera. A sequence control part 86 for compensating image shake, controls an image shake compensation sequence, responding to a signal from the camera sequence control microcomputer 60. The drive control part 82 determines a target position to drive, based on the output of shake from the image shake amount detecting part 84. At this time, the target position is rectified with respect to the quantity which changes depending to the temperature, by using the output of the temperature sensor 72. By detecting a present position signal outputted from the drive circuit part 70 and by comparing it with the target position, an optimal control value (in this case, a value of voltage applied to the actuators) is determined, and it outputs to the drive circuit 70.

The temperature sensor 72 is used in order to rectify, or compensate, a change in performance by temperature. In order to realize an optimal compensation under an operating temperature condition, the change in temperature of the shake compensating optical system and the position sensor, is rectified. When necessary, the drive voltage of the actuator and other parameters are rectified.

The drive-system circuit part 70 is provided with: a drive circuit part which applies a voltage corresponding to a result calculated by the drive control part 82 to actuators 56 and 58; and a position sensor circuit part which converts a signal from each of the position sensors 52 and 53 of P and Y directions to a voltage value.

In the image shake preventing mechanism 74, the light from an object is reflected by the mirror 41. When each of actuators 57 and 58 drives the mirror 41, the light from the object is reflected by the mirror 41 in its respective direction. As a result, the image shake is corrected.

The aforementioned one actuator (or P-drive actuator) 57 is an actuator for driving the mirror 41 in the pitch direction. In this embodiment, the direct-drive system, which uses the laminating type piezoelectric element, is employed for the P-drive actuator 57.

The aforementioned one position sensor (or P-direction position sensor) 52 is a position sensor for detecting a motion, or movement, in the pitch direction of the mirror 41. In the embodiment, an IRED (infrared ray emitting diode) and a slit are provided on a movable side thereof, and a PSD is provided on the fixed side thereof.

The aforementioned other actuator (or Y-drive actuator) 58 is an actuator for driving the mirror 41 in the yaw direction. The piezoelectric element direct drive system is employed for the Y-drive actuator 58, as well as the P-drive actuator 56.

The aforementioned Y-direction position sensor 53 is a position sensor for detecting a motion, or movement, in the yaw direction of the mirror 41. In the embodiment, an IRED and a slit are provided on a movable side thereof, and a PSD is provided on the fixed side thereof, as well as the P-direction position sensor 52.

Figure 7A:
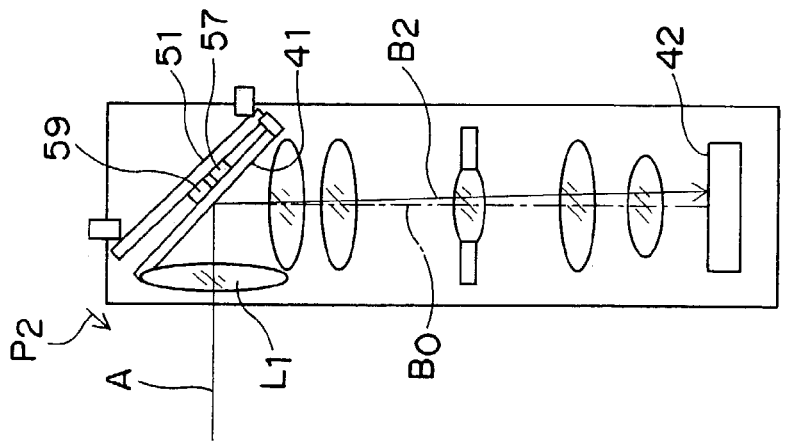
FIGS. 7A, 7B and 7C are schematic illustrations of the image shake preventing mechanism thereof.
Figure 7B:
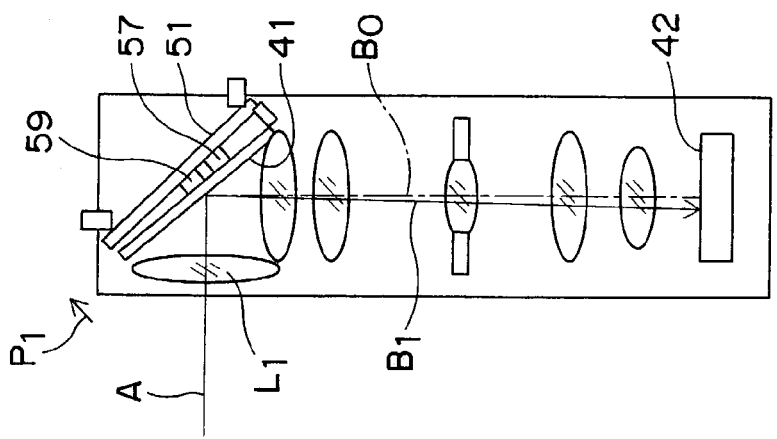
Figure 7C:
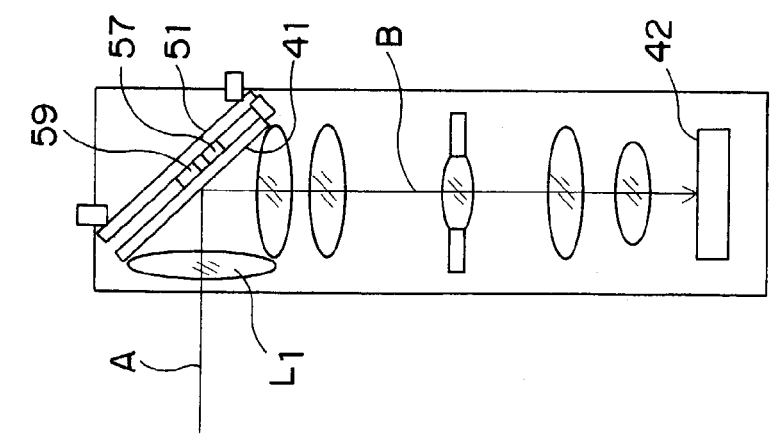

Next, it is explained about an operation to compensate or correct the image shake, referring to FIGS. 7A, 7B, and 7C.

FIGS. 7A, 7B and 7C illustrate an image shake compensating (or correcting) principle of the pitch direction in detail. By controlling a voltage applied to the piezoelectric element 57, length or displacement thereof is changed. Thus, the mirror 41 rotates in the pitch direction around a center support part (i.e. about the line "T" in FIG. 10B).

FIG. 7A shows a case where no voltage is applied to the piezoelectric element of the p-drive actuator 57.

FIG. 7B shows a case where a positive voltage is applied to the piezoelectric element 57 so that the piezoelectric element of the p-drive actuator 57 extends. Thereby, the mirror 41 rotates in a direction designated by an arrow P1 (or in a clockwise direction in FIG. 7B), so that the optical axis $B_1$ moves ahead or forward, with respect to a standard condition, or position, as shown by $B_0$.

FIG. 7C shows a case where a negative voltage is applied to the piezoelectric element of the p-drive actuator 57, so that the piezoelectric element of the actuator 57 refracts or shrinks. Thereby, the mirror 41 rotates in the other direction designated by an arrow P2 (or in a counterclockwise direction in FIG. 7C), so that the optical axis $B_2$ moves backward or rearward, with respect to the standard condition, or position, as shown by $B_0$.

Relation between a rotational angle through which the mirror 41 is driven to rotate and an angle in which the camera body 12 is shaken, is shown by an equation below:

$$\theta_M = \theta_C / P_{L1} \qquad (1)$$

In the equation, "$\theta_M$" is a rotational angle of the mirror 41, "$\theta_c$" is a rotational angle caused by shake of the camera body 12, and "$P_{L1}$" is a power of the lens L1.

It is desirable to employ the lens L1 having a strong (or great) power, in order to realize the compensation of the image shake with a small displacement of the piezoelectric element. On the contrary, it is desirable to employ the lens L1 having a weak (or small) power, in order to miniaturize the image taking lens. In this case, an actuator having a large displacement (for example, an impact actuator employing a piezoelectric element, a bimorph actuator employing a piezoelectric element, and the like) can be employed for the actuator.

The relation between the rotating amount of the mirror 41 and the moving amount of the image focused on the acceptance surface of the image sensor 62 changes, depending on its zoom position and its focal position. Therefore, it is desirable to rectify (or compensate) the rotation amount of the mirror 41 for driving it, based on the condition or state of the digital camera 10.

Figure 8A:
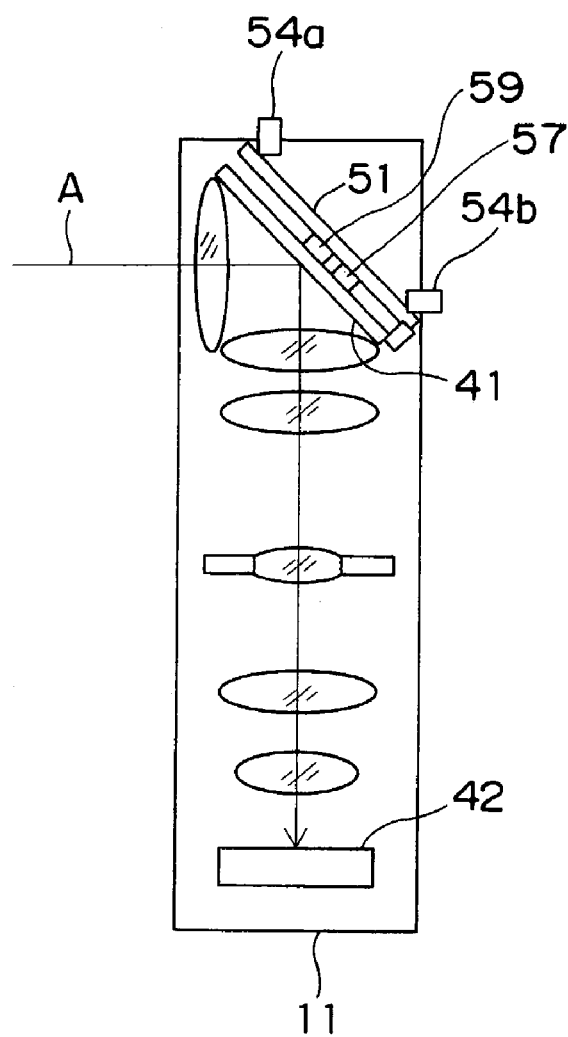
FIGS. 8A and 8B are schematic illustrations showing how to adjust the deflection of the optical axis of a bent optical system of the bent optical unit.
Figure 8B:
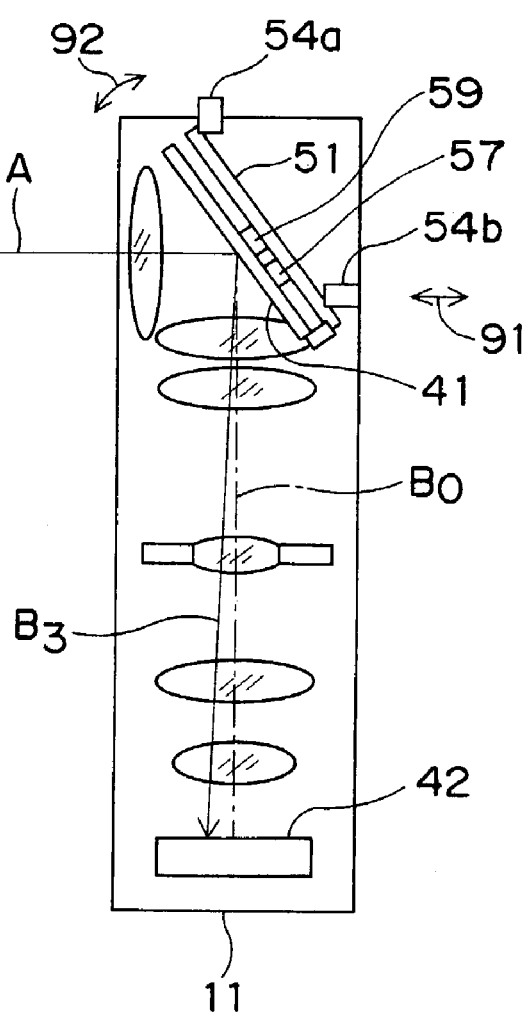

Next, it is explained about an adjustment of the deflection of the optical axis, referring to FIGS. 8A and 8B. In order to adjust the deflection of the optical axis, the aforementioned pair of adjustment members 54a and 54b with which the camera cone unit 11 is provided, are moved for the adjustment so that the mirror 41 is moved or shifted with respect to a housing of the camera cone unit 11. For example, screws, members made of heat hardening resin, and so on, are employed for the adjustment members 54a and 54b. The deflection of the optical axis is adjusted before shipment from factory.

For example, as shown in FIG. 8B, the adjustment member 54a can move in a direction as shown by an arrow 91. When the member 54a is a screw, it is rotated to realize the movement. Thereby, the mirror 41 is rotated in a direction designated by an arrow 92 so that the angle of the mirror 41 is changed. In such an adjustment, there is no need of driving the piezoelectric element.

On the other hand, in case that the piezoelectric element is driven not only for correcting the image shake, but also for adjusting the deflection of the optical axis, it is possible to prevent a camera body from becoming large, even if the optical axis deflection adjustment mechanism is provided. That is, the piezoelectric element for compensating the image shake is used to move the mirror 41 so that the optical axis locates at a predetermined position. In this arrangement, an image is captured under a condition of applying a voltage to the piezoelectric element so as to move it to the predetermined position.

Alternatively, it is possible to perform a general adjustment thereof by employing the adjustment mechanism as shown in FIG. 8, and to perform a precise adjustment by using the image shake compensating mechanism.

As explained above, the bent optical system in which the deflection of the optical axis is adjustable, is useful to make the camera body low-profile and compact. With the arrangement, the mirror drive mechanism for correcting the image shake becomes simple, and thus the digital camera can be miniaturized. In addition, with the arrangement, the optical system employed exclusively for correcting the image shake, such as an afocal lens, becomes unnecessary.

Moreover, with the arrangement, it is possible to combine an optical axis deflection adjustment function with the image shake correction function, or it is possible to adopt the optical axis deflection adjustment mechanism for an additional precise adjustment, which is difficult by using the optical axis deflection adjustment mechanism.

Although the present invention has been fully described in connection with the preferred embodiment thereof with reference to the accompanying drawings, it is to be noted that various other changes and modifications are also apparent to those skilled in the art.

For example, the mirror can be driven by any proper actuator (for example, impact actuator employing a piezoelectric element). Moreover, the mirror is not limited to the mirror which is supported by a single point substantially or generally and which is driven in two directions around the single point. For example, the mirror may be supported by three or more piezoelectric elements, without a raised portion for supporting the mirror (i.e. without a support projection for the mirror).

Parallel translation of the mirror in a direction perpendicular to a reflective surface of the mirror and angle change of the mirror in a plane including the bent optical axis, can be combined. Moreover, instead of the mirror, for example, a triangular prism can be used to bend the optical axis thereof. In this arrangement, the prism is moved to compensate or correct the image shake.

Figure 11:
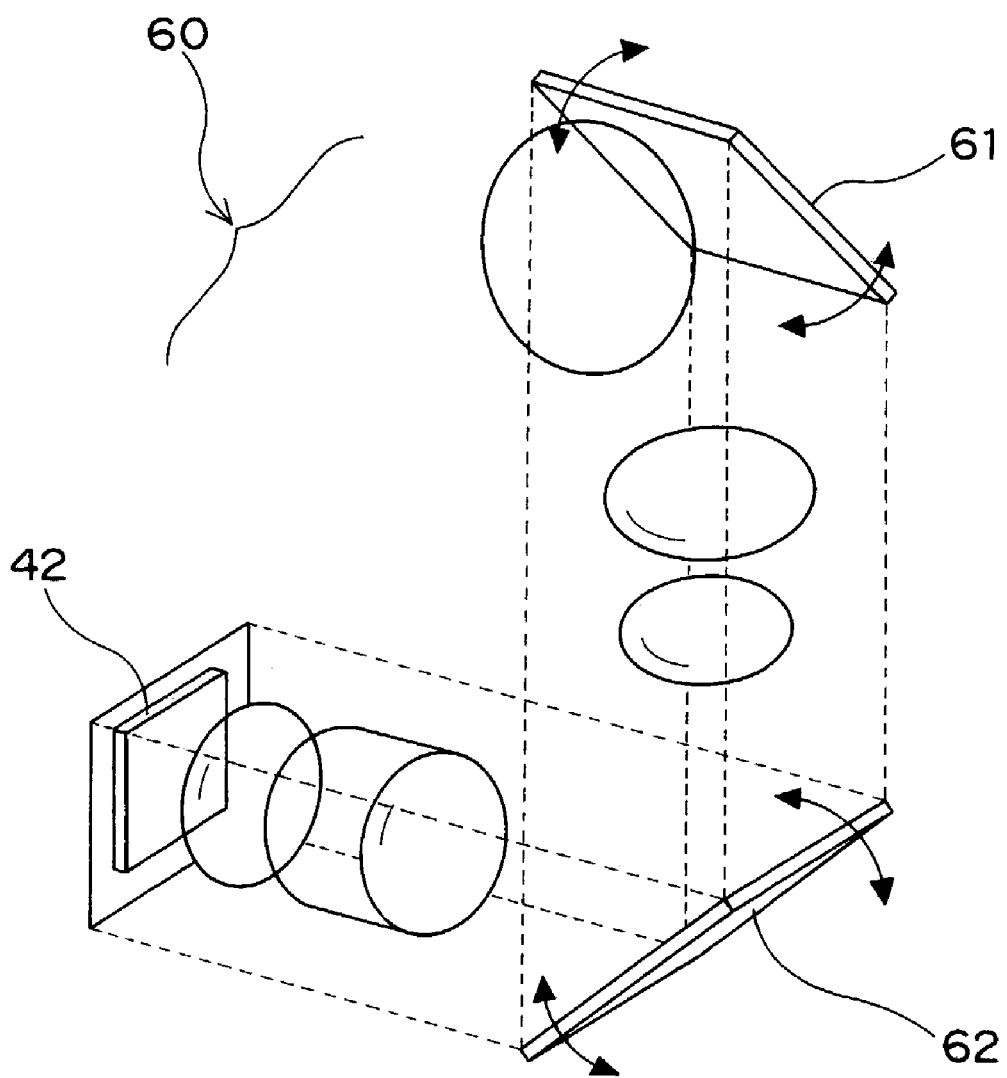
FIG. 11 is a perspective view of a bent optical system according to a modification to the preferred embodiment.

Moreover, the bent optical system 60 having two optically bent components (or mirrors) as shown in FIG. 11, can be used. As shown in FIGS. 12A and 12B, the digital camera provided with the bent optical system 60 can rectify or correct the deflection of the optical axis in the pitch direction by moving a mirror 61, and the deflection thereof in the yaw direction by moving a second mirror 62. Each of the mirrors 61 and 62 is pivotally supported at a center thereof, as shown in FIGS. 12A and 12B. Each of the mirrors 61 and 62 is driven by an actuator 57. The method of detecting any shake of rotation of the camera body by a gyroscope and of controlling the drive of the actuator, is the same as that of the aforementioned embodiment.

What is claimed is:

1. An image taking device for taking an image of an object, comprising:
   a bending optical system for forming the image thereof on a light receiving surface, in which the bending optical system includes at least one optical bending member which generally perpendicularly bends an optical axis of the bending optical system from the object to the light receiving surface;

a driving mechanism for driving the at least one optical bending member so as to change an angle of the optical axis having been bent by the at least one optical bending member;

a shake detector for detecting a shake of a body of the image taking device; and a controller for controlling the driving mechanism on a basis of the shake of the body of the image taking device detected by the shake detector, so that the at least one optical bending member is driven by the driving mechanism so as to cancel the shake of the image of the object formed on the light receiving surface;

wherein the at least one optical bending member driven by the driving mechanism and the driving mechanism are mounted on a moving unit, and wherein the moving unit is movably mounted by a position adjuster which is located behind the moving unit.

* * * * *